(12) United States Patent
Zhao et al.

(10) Patent No.: US 10,003,267 B1
(45) Date of Patent: Jun. 19, 2018

(54) ISOLATED DC-DC CONVERTER WITH AN H-BRIDGE CIRCUIT

(71) Applicant: Analog Devices Global, Hamilton (BM)

(72) Inventors: Tianting Zhao, Beijing (CN); Baoxing Chen, Westford, MA (US); Yue Zhuo, Beijing (CN)

(73) Assignee: Analog Devices Global, Hamilton (BM)

( * ) Notice: Subject to any disclaimer, the term of this patent is extended or adjusted under 35 U.S.C. 154(b) by 0 days. days.

(21) Appl. No.: 15/383,480

(22) Filed: Dec. 19, 2016

(51) Int. Cl.
  *H02M 3/335* (2006.01)
  *H02M 1/44* (2007.01)

(52) U.S. Cl.
  CPC ......... *H02M 3/33507* (2013.01); *H02M 1/44* (2013.01)

(58) Field of Classification Search
  CPC ............. H02M 3/335; H02M 3/33507; H02M 3/3382; H02M 3/33569; H02M 3/33584; H02M 3/33523; H02M 3/33592; H02M 2001/0058; H02M 2007/4815; H02M 1/44; H02J 9/06; Y10T 307/625; Y02B 70/1433; Y02B 70/1441; Y02B 70/1475; Y02B 70/1491; G03G 15/80; G03G 15/00
  USPC ....................... 363/16, 17, 21.12, 21.17, 126
  See application file for complete search history.

(56) References Cited

U.S. PATENT DOCUMENTS

| | | | | |
|---|---|---|---|---|
| 5,172,308 A * | 12/1992 | Tohya | ................... | H02M 3/337 363/126 |
| 5,907,223 A | 5/1999 | Gu et al. | | |
| 8,218,339 B2 | 7/2012 | Li et al. | | |
| 9,166,484 B2 * | 10/2015 | Rooijackers | ...... | H02M 3/33523 |
| 2013/0162048 A1 | 6/2013 | Kim et al. | | |
| 2014/0001858 A1 * | 1/2014 | Kwasinski | ........ | H02M 3/33569 307/52 |

(Continued)

FOREIGN PATENT DOCUMENTS

| | | |
|---|---|---|
| CN | 202475268 U | 10/2012 |
| CN | 203398993 U | 1/2014 |
| CN | 203645381 U | 6/2014 |

(Continued)

OTHER PUBLICATIONS

Chen, Fully integrated isolated dc-dc converter using micro-transformers. Proc IEEE Appl Power Electron Conf Expo (APEC). Feb. 2008;335-8.

(Continued)

*Primary Examiner* — Yemane Mehari
(74) *Attorney, Agent, or Firm* — Wolf, Greenfield & Sacks, P.C.

(57) ABSTRACT

Isolated DC-DC converters and methods for operating the same are described herein. DC-DC converters include a driver that drives a primary winding of a transformer to transmit power to a secondary winding of the transformer across an isolation barrier. In some embodiments, a pair of symmetrical serial capacitors are provided between the driver and the primary winding of a resonant DC-DC converter with an on-chip transformer to slow down variations of a common mode voltage on the primary winding during operation. This in turn can suppress radiation emissions related to time variation rates of the common mode voltage and, and can also improve electromagnetic interference (EMI) performance of the DC-DC converter.

20 Claims, 11 Drawing Sheets

(56) References Cited

U.S. PATENT DOCUMENTS

2015/0180349 A1\* 6/2015 Hayasaki ............... G03G 15/80
399/88
2015/0180350 A1\* 6/2015 Huang ................. H02J 7/0068
307/66

FOREIGN PATENT DOCUMENTS

| CN | 104506039 A | 4/2015 |
|---|---|---|
| CN | 104953846 A | 9/2015 |
| CN | 105811785 A | 7/2016 |

OTHER PUBLICATIONS

Chen, Isolated half-bridge gate driver with integrated high-side supply. Proc IEEE Power Electron Specialists Conf (PESC). Jun. 2008;3615-8.

Jung et al., Theoretical Analysis and Optimal Design of LLC Resonant Converter. 2007 European Conference on Power Electronics and Applications. Oct. 2007 10 pages.

Patterson et al., Pseudo-resonant full bridge DC/DC converter. IEEE Trans Power Elec. 1991;6(4):671-8.

Yang, Chapter 4: LLC Resonant Converter. In "Topology Investigation for Front End DC/DC Power Conversion for Distributed Power System." Virginia Polytechnic Institute and State University. Dissertation. Sep. 12, 2003;94-141.

\* cited by examiner

ISOLATED DC-DC CONVERTER WITH AN H-BRIDGE CIRCUIT

FIELD OF THE DISCLOSURE

The present application relates to an isolated DC-DC converter.

BACKGROUND

Galvanic isolation between circuit components and transmission of data and power across an isolation barrier is often provided for safety and/or data integrity considerations. Some isolated DC-DC converters include a driver that drives a primary winding of a transformer to transmit power to a secondary winding of the transformer across an isolation barrier. A rectifier converts the received voltage at the secondary winding of the transformer into an output DC voltage.

THE SUMMARY OF THE DISCLOSURE

Isolated DC-DC converters and methods for operating the same are described herein. DC-DC converters include a driver that drives a primary winding of a transformer to transmit power to a secondary winding of the transformer across an isolation barrier. In some embodiments, a pair of symmetrical serial capacitors are provided between the driver and the primary winding of a resonant DC-DC converter with an on-chip transformer to slow down variations of a common mode voltage on the primary winding during operation. This is turn can suppress radiation emissions related to time variation rates of the common mode voltage and, and can also improve electromagnetic interference (EMI) performance of the DC-DC converter.

In some embodiments, a DC-DC converter is provided. The DC-DC converter comprises a primary winding having first and second terminals; a secondary winding separated from the primary winding by an isolation barrier; a full bridge driver; a first capacitor coupled between the full bridge driver and the first terminal of the primary winding and a second capacitor coupled between the full bridge driver and the second terminal of the primary winding.

In some embodiments, a method of operating a DC-DC converter is provided. The DC-DC converter comprises a primary winding, a secondary winding and a full bridge driver. The secondary winding is separated from the primary winding by an isolation barrier. The method comprises driving a signal from the full bridge driver through a serial current path through a first capacitor coupled to a first terminal of the primary winding, the primary winding and a second capacitor coupled to a second terminal of the primary winding.

In some embodiments, a resonant DC-DC converter is provided. The DC-DC converter comprises a transformer having a primary winding and a secondary winding integrated on a semiconductor substrate. The secondary winding is separated from the primary winding by an isolation barrier. The DC-DC converter further comprises a full bridge driver capacitively coupled to the primary winding with a serial capacitor. The resonance DC-DC converter further comprises a feedback loop coupled between an output of the DC-DC converter and an input of the full bridge driver.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application provide isolator circuits which transfer a direct current (DC) signal from a first side of the isolated circuit across an isolation barrier to a second side of the isolated circuit. These isolator circuits represent DC-DC converters, converting a first DC signal, such as a power signal, on the first side to a second DC signal on the second side. Galvanic isolation between the first and second sides of the isolation circuit, which are also referred to herein as the primary and second sides, respectively, provides safe circuit operation and/or data integrity. According to an aspect of the present application, the isolator circuit includes a transformer bridging the isolation barrier, with the transformer having one winding on the primary side and another winding on the secondary side. The primary side includes a circuit for driving a signal to the winding of the transformer on the primary side, and includes one or more capacitors coupled electrically between the driving circuit and the transformer winding on the primary side. Placing the capacitor(s) between the driving circuit and the transformer winding on the primary side reduces undesirable current flow across the isolation barrier in at least some embodiments.

A resonant DC-DC converter is one which includes a resonating drive circuit on the primary side of the converter. In a resonant DC-DC converter, an input DC voltage is supplied to a driver circuit at the primary side to drive a primary winding of a transformer with alternating current signals (AC signals) at a particular frequency according to one or more control signals supplied to the driver circuit. The secondary winding of the transformer, on the secondary side of the converter, is electromagnetically coupled to the primary winding and thus receives the AC signals transmitted from the primary winding. A rectifier circuit at the secondary side converts the received AC signals into a DC output voltage.

The inventors have appreciated that parasitic capacitance between the primary winding and the secondary winding in a DC-DC converter may give rise to a time-varying leakage current when the relative voltage difference between the two windings changes, for example when the primary winding is driven by the driver at a high frequency. The leakage current across the isolation barrier is undesirable. When the leakage current flows across conductors inside or adjacent to the DC-DC converter, for example across different electrical ground planes in a circuit board housing the circuit components, high frequency radiation may be generated and emitted, which may cause interference with other electronic components. Such radiation may be particularly undesirable when the DC-DC converter is used in automotive or medical applications.

Aspects of the present application provide improved electromagnetic interference performance in an isolated DC-DC converter. The isolated DC-DC converter includes a transformer with a primary winding coupled to a driver circuit. Symmetrical serial coupling capacitors connect the driver circuit to the primary winding of the transformer. Such a configuration reduces radiation from leakage current across the isolation barrier, in at least some embodiments.

Figure 1:
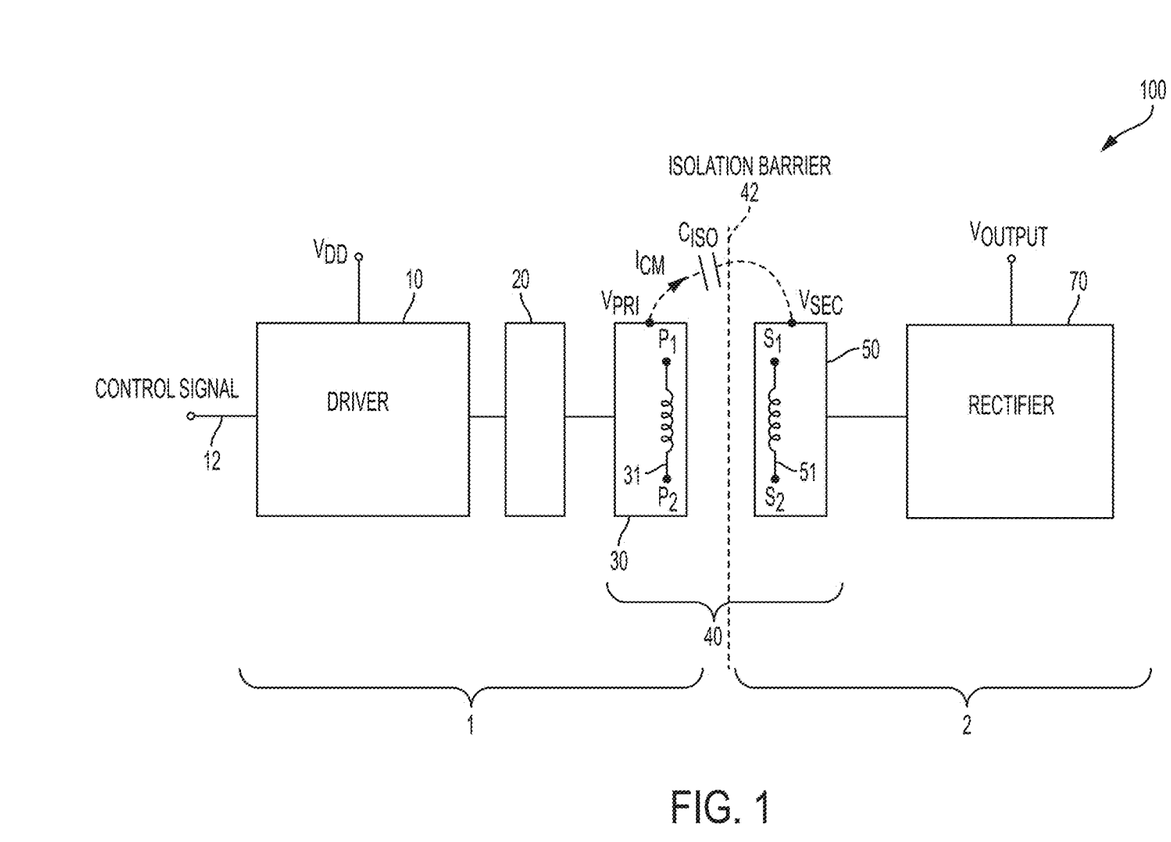
FIG. 1 is a high level block diagram of an exemplary isolated DC-DC converter, according to aspects of the present disclosure.

FIG. 1 is a high level block diagram of an exemplary isolated DC-DC converter 100, according to aspects of the present disclosure. The DC-DC converter 100 comprises a primary side 1 having a driver 10 and coupling capacitors 20. The DC-DC converter 100 further comprises a transformer 40 with a primary side 30 and primary winding 31. The DC-DC converter further comprises a secondary side 2 having a transformer secondary side 50 with a secondary winding 51, and a rectifier 70.

In the DC-DC converter 100, a DC voltage $V_{DD}$ and one or more control signals 12 are provided to driver 10 to drive the primary winding 31 in the primary side 30 of the transformer 40 via the coupling capacitor block 20. The primary winding 31 is electromagnetically coupled to the secondary winding 51 across an isolation barrier 42, which may be formed of a dielectric. The secondary winding 51 is coupled to a rectifier 70 to convert signals received in the secondary winding 51 into an output DC voltage $V_{OUTPUT}$.

In some embodiments, driver 10 modulates the DC voltage $V_{DD}$ in response to control signals 12 to drive the primary winding 31 with alternating currents at a certain frequency. The driver 10 may take any suitable form, and in some embodiments is a resonating circuit. Examples are shown in FIGS. 2A, 2B, and 3-5.

The inventors have recognized that input-to-output dipole emission may occur in a DC-DC converter if a common mode current traverses the isolation barrier of the converter. For purposes of explanation, the common mode current $I_{CM}$ is shown in FIG. 1 although, as will be described further below, the illustrated circuit construction may limit or prevent entirely the occurrence of such currents. The magnitude of the common mode current $I_{CM}$ may be computed as:

$$I_{CM}=C_{ISO} \cdot d(V_{PRI}-V_{SEC})/dt \quad (1).$$

Here, $C_{ISO}$ is the parasitic capacitor between the primary winding 31 and secondary winding 51 and $V_{PRI}$ and $V_{SEC}$ are the common voltage on the transformer primary side 30 and transformer secondary side 50, respectively. In some embodiments, $V_{PRI}$ may be represented by an average of the voltages at the two terminals $P_1$, $P_2$ of the primary winding 31 and $V_{SEC}$ may be represented by an average of the voltages at the two terminals $S_1$, $S_2$ of the secondary winding 51. The common mode current may generate input-to-output dipole radiation by, for example, driving a current across a gap between electrical ground planes in the device.

The inventors have appreciated that by reducing the rate of variation of $V_{PRI}$ during operation of the DC-DC converter, dipole emission due to common mode current $I_{CM}$ may be reduced, thus improving device electromagnetic interference performance. In some embodiments, coupling capacitors 20 may comprise one or more serial capacitors between the primary winding 31 and the driver 10. The serial capacitors may, and in at least some embodiments do, delay the rate of variations in the voltages at the two terminals $P_1$, $P_2$ of the primary winding when the driver 10 is configured to supply a series of voltage pulses at a certain frequency in response to the control signal 12. In some embodiments, soft-switching techniques such as zero voltage switching in the driver 10 may be used to reduce the variation of the voltages at the two terminals $P_1$, $P_2$ of the primary winding.

The primary winding 31 and secondary winding 51 may be any suitable conductor coils electromagnetically coupled to each other to transmit power across the isolation barrier 42. According to a preferred embodiment, the primary winding 31 and secondary winding 51 of the isolated DC-DC converter 100 in FIG. 1 may be integrated on a same semiconductor substrate (not shown) to save packaging space and improve coupling efficiency. In some embodiments, the primary winding 31 and secondary winding 51 may be part of an on-chip transformer 42 fabricated on the same semiconductor substrate. In one example, the primary winding 31 and secondary winding 51 may comprise spiral metal conductors disposed on one or more faces of the same semiconductor substrate, without any magnetically active material in a core of both windings (hereinafter also referred to as "air core transformer"). In another example, high magnetic permeability material may be provided in the core of both the primary and secondary windings of an on-chip transformer (hereinafter also referred to as "magnetic core transformer") to increase the self-inductance and mutual inductance values of the windings as compared to an air core transformer with windings of the same dimension, or to allow smaller transformer footprint compared to an air core transformer of the same inductance values. In one example, the magnetic core transformer comprises CoZrTa, although it should be appreciated that any suitable magnetic material may be used in the core.

Figure 2A:
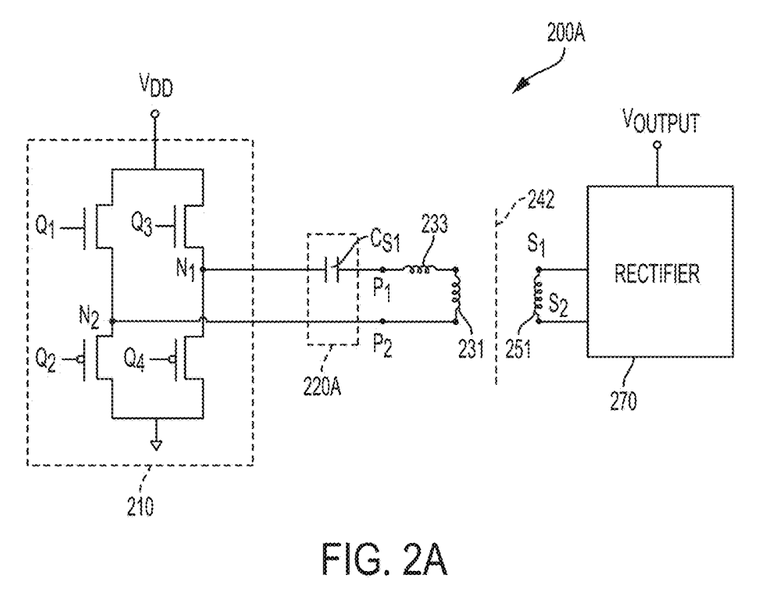
FIG. 2A is a schematic circuit diagram of an exemplary isolated DC-DC converter representing one implementation of the DC-DC converter of FIG. 1, according to some aspects of the present disclosure.

FIG. 2A is a schematic circuit diagram of an exemplary isolated DC-DC converter 200A representing one non-limiting implementation of the DC-DC of FIG. 1. DC-DC converter 200A comprises a full bridge driver 210 comprising four switches Q1, Q2, Q3, and Q4, coupling capacitor block 220A comprising a serial capacitor $C_{S1}$, a primary winding 231 having a first terminal P1 and a second terminal P2, an inductor 233, a secondary winding 251 isolated from primary winding 231 across an isolation barrier 242, and a rectifier 270.

According to some aspects of the present disclosure, serial capacitor $C_{S1}$ capacitively couples a voltage node N1 of the full bridge driver 210 with the first terminal P1. In some embodiments, serial capacitor $C_{S1}$ connects the full bridge driver 210 with the first terminal P1 of the primary winding 231 and forms a serial current path from the voltage node N1 of the full bridge driver, via the serial capacitor $C_{S1}$, across the primary winding 231 and through the voltage node N2 of the full bridge driver.

In some embodiments, during operation of the DC-DC converter 200A, the switches in the full bridge driver 210 are controlled by external control signals (not shown) to open and close sequentially such that an AC current of a certain frequency flows from voltage node N1 of the full bridge driver to the first terminal P1 of the primary winding 231 via the serially coupled capacitor $C_{S1}$. The AC current flowing through the primary winding 231 generates a corresponding voltage signal between the two terminals S1 and S2 of the secondary winding 251. The voltage signal is rectified in the rectifier 270 to provide a DC output voltage $V_{OUTPUT}$.

In some embodiments, a resonant LC tank circuit is formed comprising serial capacitor $C_{S1}$ and inductor 233 and the DC-DC converter 200A is a resonant converter. Inductor 233 may be any suitable inductor for formation of a resonant LC tank circuit and in some embodiments, inductor 233 may be the leakage inductance of the primary winding 231. Although not shown in FIG. 2A, in some embodiments, the resonant LC tank circuit may comprise additional capacitance and/or inductance.

Figure 2B:
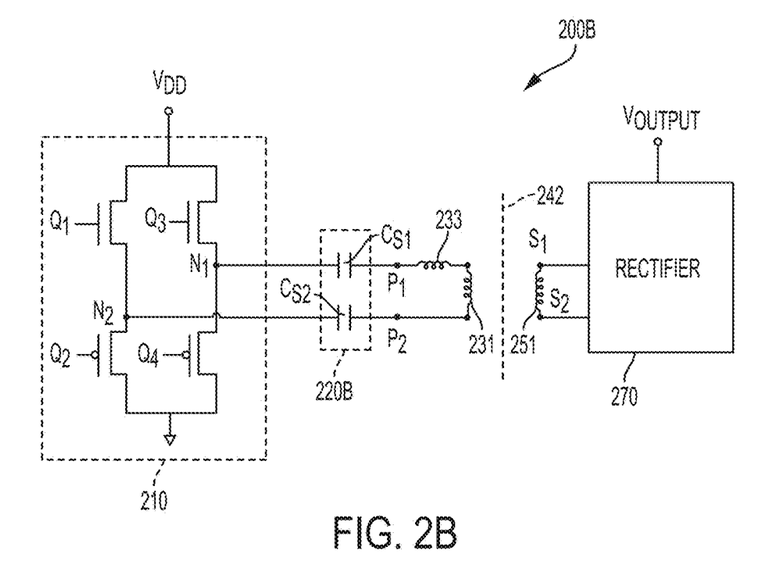
FIG. 2B is a schematic circuit diagram of an alternative exemplary isolated DC-DC converter representing an implementation of the DC-DC converter of FIG. 1, according to some aspects of the present disclosure.

FIG. 2B is a schematic circuit diagram of an alternative exemplary isolated DC-DC converter 200B representing an alternative implementation of the DC-DC converter of FIG. 1. DC-DC converter 200B shares several of the components of DC-DC converter 200A of FIG. 2A, but differs in that the coupling capacitor block 220B includes both the serial capacitor $C_{S1}$ and a second serial capacitor $C_{S2}$. These capacitors may be of the same value (symmetrical) in some embodiments. The primary winding 231 and inductor 233 are arranged serially between the coupling capacitors $C_{S1}$ and $C_{S2}$.

In the example of DC-DC converter 200B, serial capacitor $C_{S1}$ capacitively couples the voltage node N1 of the full bridge driver 210 with the first terminal P1, while serial capacitor $C_{S1}$ capacitively couples the voltage node N2 of the full bridge driver 210 with the second terminal P2 of the primary winding 231. In some embodiments, a serial current path is formed from the voltage node N1 of the full bridge driver 210, via serial capacitor $C_{S1}$, across terminals P1 and P2 of the primary winding 231, through serial capacitor $C_{S2}$ to the voltage node N2 of the full bridge driver.

In some embodiments, during operation of the DC-DC converter 200B, the switches in the full bridge driver 210 are controlled by external control signals (not shown) to open and close sequentially such that an AC current of a certain frequency flows from voltage node N1 of the full bridge driver to the first terminal P1 of the primary winding 231 via the serially coupled capacitor $C_{S1}$. After flowing across the primary winding 231, the AC current exits the second terminal P2 and flows through serial capacitor $C_{S2}$ to voltage node N2 of the full bridge driver. The AC current flowing through the primary winding 231 generates a corresponding voltage signal between the two terminals S1 and S2 of the secondary winding 251. The voltage signal is rectified in the rectifier 270 to provide a DC output voltage $V_{OUTPUT}$.

Serial capacitors $C_{S1}$ and $C_{S2}$ may, and in at least some embodiments do, make the voltages at the two terminals P1 and P2 of the primary winding substantially symmetric during transitions of current amplitude and direction along the current path from voltage node N1 through the primary winding 231 to the voltage node N2. Thus, common mode voltage variations in the primary winding may be reduced, in turn reducing dipole radiation and improving electromagnetic interference (EMI) performance.

Figure 3:
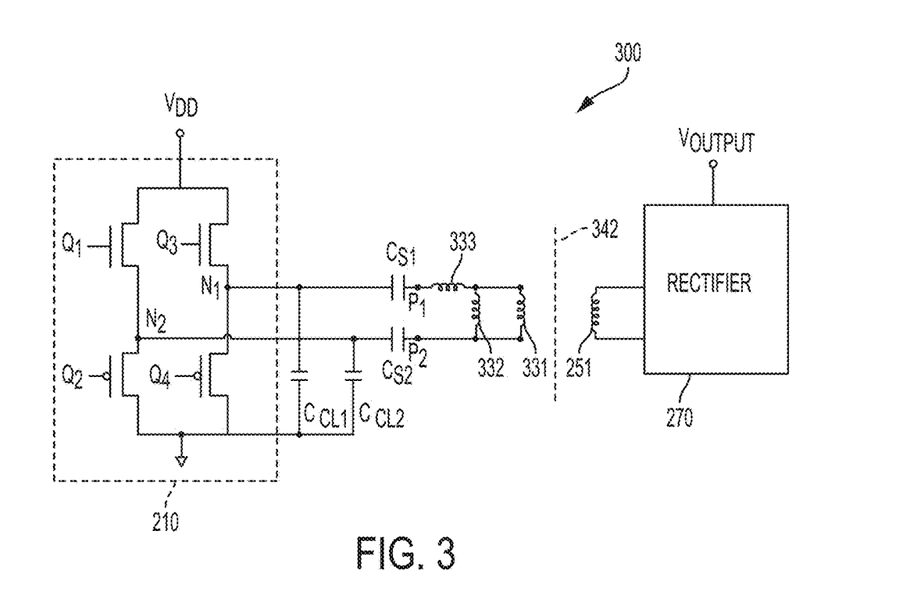
FIG. 3 is a schematic circuit diagram of a further alternative exemplary isolated DC-DC converter according to some aspects of the present disclosure, including additional LC circuitry compared to the DC-DC converter of FIG. 2B.

FIG. 3 is a schematic circuit diagram of an exemplary isolated DC-DC converter 300 according to some aspects of the present disclosure. DC-DC converter 300 includes several of the components of DC-DC converter 200B of FIG. 2B, but differs in that it additionally includes an inductor 332 in parallel with the primary winding 331, an inductor 333 and parallel capacitors $C_{CL1}$ and $C_{CL2}$.

As shown, parallel capacitor $C_{CL1}$ is coupled in parallel with switch Q2 of the full-bridge driver 210 such that $C_{CL1}$ is connected between voltage node N1 and ground. Capacitor $C_{CL2}$ is coupled in parallel with switch Q4, such that $C_{CL2}$ is connected between voltage node N2 and ground. In some embodiments, DC-DC converter 300 may comprise a resonant LC tank circuit comprising inductors 332, 333 and serial capacitors $C_{S1}$ and $C_{S2}$. Although not shown in FIG. 3, in some embodiments, the resonant LC tank circuit may comprise additional capacitance and/or inductance. Inductor 333 may be any suitable inductor for formation of a resonant LC tank circuit and in some embodiments, inductor 333 may be the leakage inductance of the primary winding 331. Inductor 332 may be any suitable inductor for formation of a resonant LC tank circuit and in some embodiments, inductor 332 may be the magnetization inductance of the primary winding 331.

In some embodiments, the full bridge driver 210 is an H-bridge between $V_{DD}$ and ground and the DC-DC converter 300 is a resonant converter. The switches Q1, Q2, Q3 and Q4 are driven by control signals (not shown) to open and close sequentially to drive an alternating current through the primary winding 331. The frequency of the alternating current is based at least in part on a resonant frequency of the resonant LC tank circuit.

According to some aspects, when operating the DC-DC converter 300, during a first phase of an operating sequence, switches Q1 and Q4 of the H-bridge driver 210 are open while Q2 and Q3 remain closed. A current flows from $V_{DD}$ through voltage node N1, serial capacitance $C_{S1}$ and across terminals P1 and P2 of the primary winding, before returning to voltage node N2 and into ground via serial capacitance $C_{S2}$. During a second phase of the sequence, all switches Q1-Q4 are turned off in the H-bridge driver 210. This second phase is also referred to as the non-overlap period during which no switches are turned on. The remnant current in the inductor 332 flows through parallel capacitors $C_{CL1}$ and $C_{CL2}$ to ground. The parallel capacitors $C_{CL1}$ and $C_{CL2}$ enable soft switching of switches Q1 and Q4 when they are turned off at the end of the first period as well as switches Q2 and Q3 when they are turned on at the beginning of a third period, such that any given switch has nearly zero voltage on it when transitioning between current on and off states. Such zero-voltage switching is effective in both improving converter efficiency and slowing down voltage variations inside the driver and at terminals of the primary winding 331. At the end of the third phase, the driver is again configured as in the second phase, with all switches turned off. The phase sequence may then repeat from the first phase to second phase, third phase, and back to second phase. This sequence may be iterated many times.

It should be appreciated that while zero voltage switching is described in relation to the DC-DC converter 300 in FIG. 3, other soft switching schemes such as zero current switching may additionally or alternatively be employed. Although $C_{CL1}$ and $C_{CL2}$ are shown as both connected to ground in FIG. 3, optionally and alternatively one or both of $C_{CL1}$ and $C_{CL2}$ may be coupled in parallel with one of switches Q1 and Q3 and connected between voltage node N1/N2 and $V_{DD}$, respectively. In some embodiments, four parallel capacitors are provided, with each coupled in parallel with a respective one of the four switches Q1, Q2, Q3, and Q4 of the H-bridge driver 210.

The inventors have appreciated that factors such as manufacturing tolerance and/or environmental effects may lead to variations between the switches in the full bridge or H-bridge driver circuit 210. Differences in parasitic capacitance from each one of the four switches Q1-Q4 may lead to asymmetric voltage and/or current in the primary transformer winding during different phases of the operation, which may contribute to an increase in common mode voltage at the two terminals of the primary winding and lead to increased electromagnetic interference due to increased common mode current across the isolation barrier 242. According to some aspects, the value of parallel capacitors $C_{CL1}$ and $C_{CL2}$ may be selected to be significantly bigger than the parasitic capacitance of each one of the four switches Q1-Q4. When parasitic capacitance mismatch between switches become much smaller compared to the selected parallel $C_{CL1}$ and $C_{CL2}$ values, electromagnetic interference due to the parasitic mismatch may be suppressed. The value of the parallel capacitor may be twice that of the parasitic capacitance, or five times greater, ten times greater, twenty times greater, at least ten times greater, or between twice and fifty times as great, or any value or range of values within such ranges. In one non-limiting example, the parasitic capacitance has a value of 80 pF.

In some embodiments, parallel capacitors such as $C_{CL1}$ and $C_{CL2}$ may be provided as internal capacitors disposed on the same substrate as the driver circuit 210. However, any suitable fabrication and packaging methods may be used.

In a preferred embodiment, the pair of serial capacitors $C_{S1}$ and $C_{S2}$ shown in FIG. 3 are of substantially the same size or capacitance value. As discussed further below, such symmetry between the capacitance values of the two serial capacitors $C_{S1}$ and $C_{S2}$ may help suppress common mode voltage variations at the primary winding 331. At the end of the first phase of the above sequence, the switches Q1-Q4 are all turned off at the beginning of a first non-overlap period and the voltage values $V_{P1}$ and $V_{P2}$ at terminals P1 and P2, respectively, are referenced to ground via capacitors $C_{CL1}$ and $C_{CL2}$. A residual current originates from voltage node N1 that flows across $C_{S1}$, the primary winding 331 and resonant inductor 332, through $C_{S2}$ and drains to ground via $C_{CL2}$. During this turn-off moment, transitioning from the first phase to second phase, any change in $V_{P1}$ and $V_{P2}$ is proportional to the change of residual current in the primary winding 331 and inductor 332 multiplied by the capacitances of serial capacitors $C_{S1}$ and $C_{S2}$, respectively. Similarly, at the transition between the end of the third phase of the above sequence to another non-overlap period, all four switches Q1-Q4 are turned off and a current originates from voltage node N2 that flows across $C_{S2}$, the primary winding 331 and inductor 332, through $C_{S1}$ and drains to ground via capacitor $C_{CL1}$. During this second turn-off moment, the voltage values $V_{P1}$ and $V_{P2}$ at terminals P1 and P2, respectively, are referenced to ground via capacitors $C_{CL1}$ and $C_{CL2}$ while any change in $V_{P1}$ and $V_{P2}$ is proportional to the change in residual current in the primary winding 331 and inductor 332 multiplied by the capacitances of serial capacitors $C_{S1}$ and $C_{S2}$, respectively. If $C_{S1}=C_{S2}$, and if the residual current in the primary winding 331 and inductor 332 is of the same amplitude but with opposite directions in the two non-overlap periods discussed above, then the changes in $V_{P1}$ and $V_{P2}$ in one non-overlap period will be canceled out with changes in the subsequent non-overlap period. As a result, average variations of common mode voltage at the primary winding of such a fully symmetrical DC-DC resonant converter may be suppressed, leading to an improved electromagnetic interference (EMI) performance. Although suppression of variations of common mode voltage at the primary winding is discussed in the above example with regards to turn-off moments when the switches are turned off, it should be appreciated that the pair of serial capacitors $C_{S1}$ and $C_{S2}$ with substantially equal capacitance value may also help suppress variations of common mode voltage during turn-on moments where one or more switches in the driver are turned on from a non-overlap period.

In some embodiments, the serial capacitors $C_{S1}$ and $C_{S2}$ are provided as external capacitors to the driver circuit 210 and to the primary winding 331, meaning they may be on separate substrates or even outside a packaging in which the driver circuit 210 and winding 331 are packaged. However, other configurations are possible. In one non-limiting example, each of the serial capacitors $C_{S1}$ and $C_{S2}$ has a value of 1 nF, although other values are possible.

Figure 4:
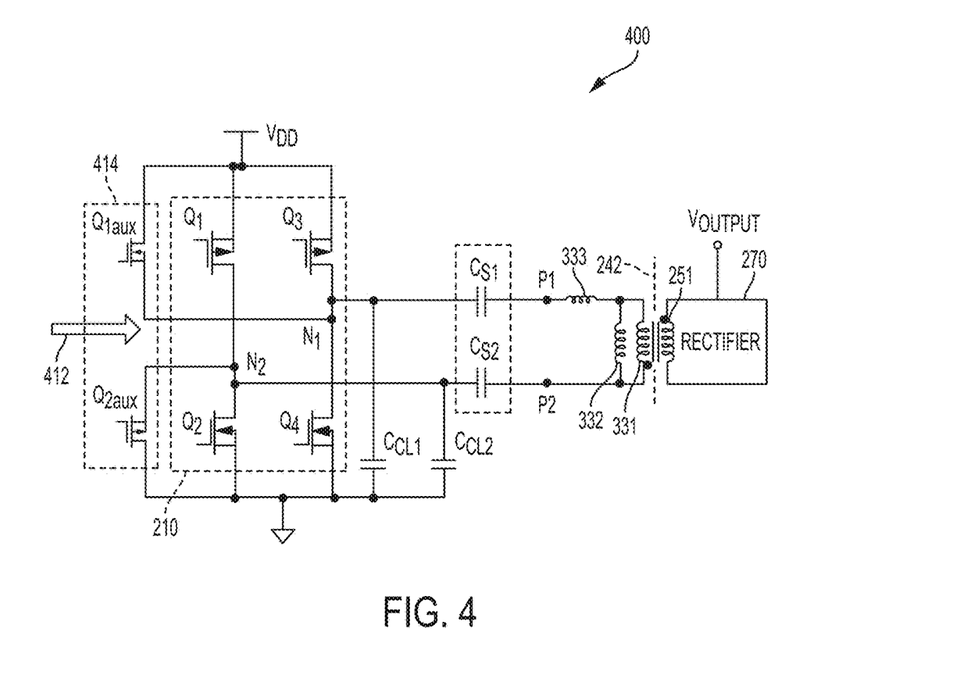
FIG. 4 is a schematic circuit diagram of an exemplary isolated DC-DC converter according to some aspects of the present disclosure.

FIG. 4 is a schematic circuit diagram of an exemplary isolated DC-DC converter 400 according to some aspects of the present disclosure. DC-DC converter 400 includes several of the components of DC-DC converter 300 of FIG. 3, but differs in that it additionally includes a precharge circuit 414 comprising two switches $Q_{1aux}$, $Q_{2aux}$.

According to some embodiments, precharge circuit 414 may be coupled to the full bridge driver 210, such that switch $Q_{1aux}$ is connected between $V_{DD}$ and voltage node N1 while switch $Q_{2aux}$ is connected between voltage node N2 and ground. Precharge circuit 414 may be activated when the DC-DC converter 400 is first turned on and when the LC tank resonator circuit comprising $C_{S1}$, $C_{S2}$, inductors 333, 332 have not been energized yet. When activated, precharge circuit 414 creates a current injection path from $V_{DD}$, to ground through $Q_{1aux}$, voltage node N1, capacitor $C_{S2}$, primary winding 331, capacitor $C_{S1}$, voltage node N2, and switch $Q_{2aux}$. In one embodiment, a control signal 412 may be used to activate precharge circuit 414 and turn on both switches $Q_{1aux}$, $Q_{2aux}$ to inject current to the LC tank resonator circuit and to "kick start" the resonator to shorten the amount of time for the resonator to achieve oscillation. The precharge circuit may be employed to reduce common mode current while the full bridge driver 210 is first turned on. Other forms of a precharge circuit may alternatively be implemented to achieve the same functionality.

Figure 5:
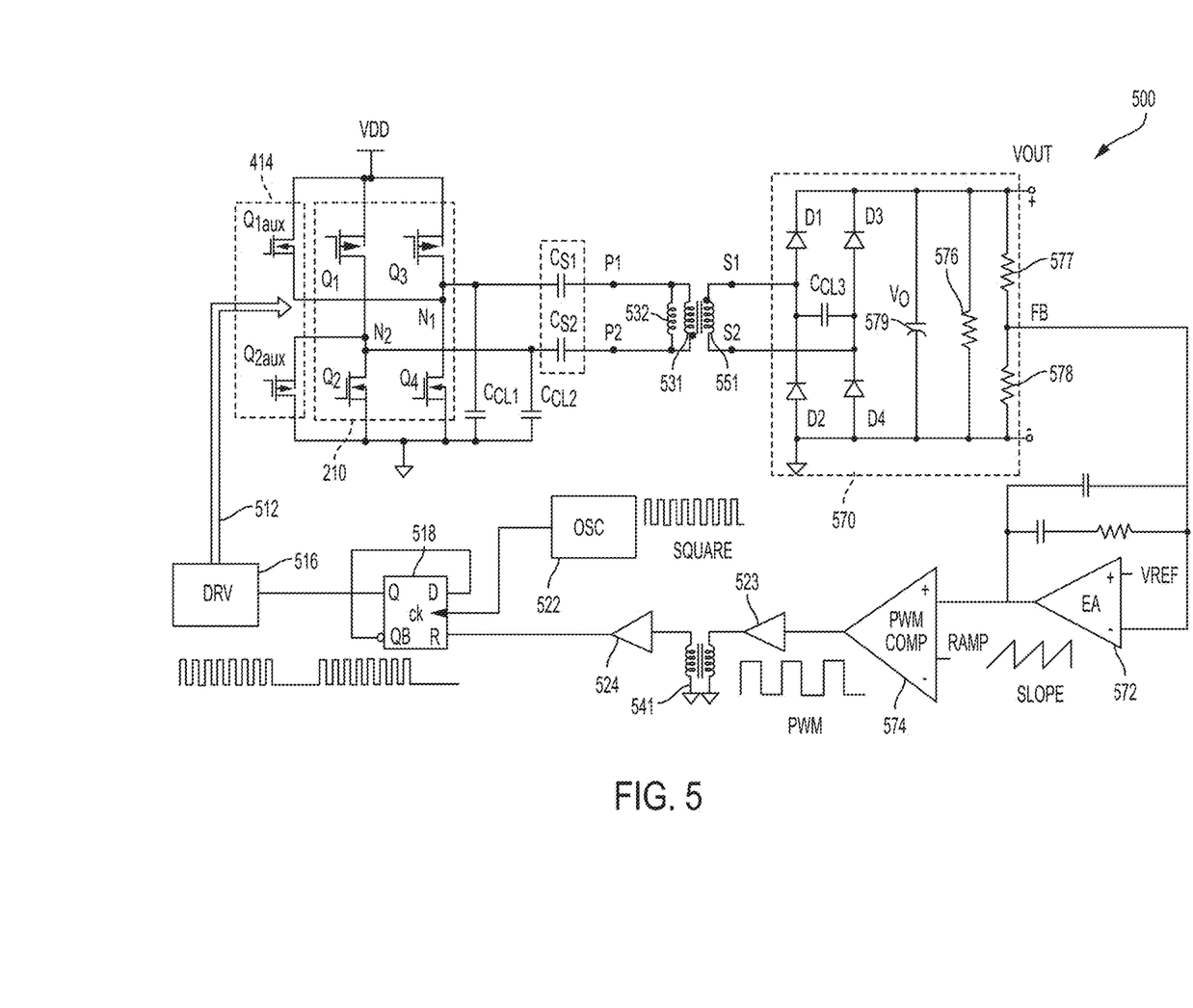
FIG. 5 is a schematic circuit diagram of an exemplary isolated DC-DC converter according to some aspects of the present disclosure.

FIG. 5 is a schematic circuit diagram of an exemplary isolated DC-DC converter 500 according to some aspects of the present disclosure. DC-DC converter 500 includes several of the components of DC-DC converter 400 of FIG. 4, but differs in that it additionally includes a secondary winding 551 having two terminals S1, S2, a rectifier 570 comprising a diode bridge having four diodes D1-D4, a parallel capacitor $C_{CL3}$, a compensation error amplifier 572, a pulse width modulation (PWM) comparator 574, encoder 523, decoder 524, a feedback transformer 541, oscillator 522, Q flip flop 518 and a driver control signal unit 516. DC-DC converter 500 further comprises a plurality of resistors 576, 577, 578 and a capacitor 579.

In some embodiments, on the secondary side of the DC-DC converter 500, full diode bridge D1-D4 rectifies voltage received at terminals S1, S2 of the secondary winding 551 and converts the received voltage into output DC voltage $V_{OUT}$. In one example, the diodes D1-D4 may be Schottky diodes.

In some embodiments, a parallel capacitor $C_{CL3}$ is provided in parallel to the two terminals S1, S2 of the secondary winding. Parallel capacitor $C_{CL3}$ may help slow down the variations of voltages at terminals S1, S2 and improve EMI performance by suppressing common mode current across the isolation barrier.

In some embodiments, a feedback loop is formed comprising the error amplifier 572, PWM comparator 574 configured to modulate the feedback (FB) signal representative of $V_{OUT}$. In one example, the feedback signal is coupled to an amplifier 572 and is compared to a reference signal $V_{REF}$ before comparing with a 200 KHz sawtooth signal at a PWM comparator 574. The output PWM signal of the PWM comparator 574 is transmitted across transformer 541 to the primary side as a feedback signal. Encoder 523 and decoder 524 may perform any number of encoding and decoding functions, before sending the transmitted feedback signal to modulate a high frequency oscillator signal generated by oscillator 522 at the Q flip flop 518. The modulated signal is sent to the driver control signal unit 516 to generate a control signal 512 to control the switches in the precharge circuit 414 as well as the full bridge driver 210. In some embodiments, the oscillator frequency may be 10 MHz, 15 MHz, 20 MHz, 24 MHz, 30 MHz, 40 MHz, between 5 and 5 MHz, between 15 and 30 MHz, or any value or range of values within such ranges.

The DC-DC converter 500 may suppress radiation and provide improved electromagnetic interference performance. In some embodiments, the EMI performance as defined in the CISPR22 Class B standard may exceed said standard by a margin of at least 5 dB, 10 dB, 15 dB, between 5 and 15 dB, or by any value or range of values within that range. In some embodiments, the EMI performance as defined in the EN55022 Class B standard may exceed said standard by a margin of at least 5 dB, 10 dB, 15 dB, 20 dB, between 5 and 15 dB, or by any value or range of values within that range. In some embodiments, a power conversion efficiency of the DC-DC converter implemented according to aspects of the present disclosure may have a value of at least 30%, 40%, or between 30 and 40%, or between 40 and 50%.

Figure 6:
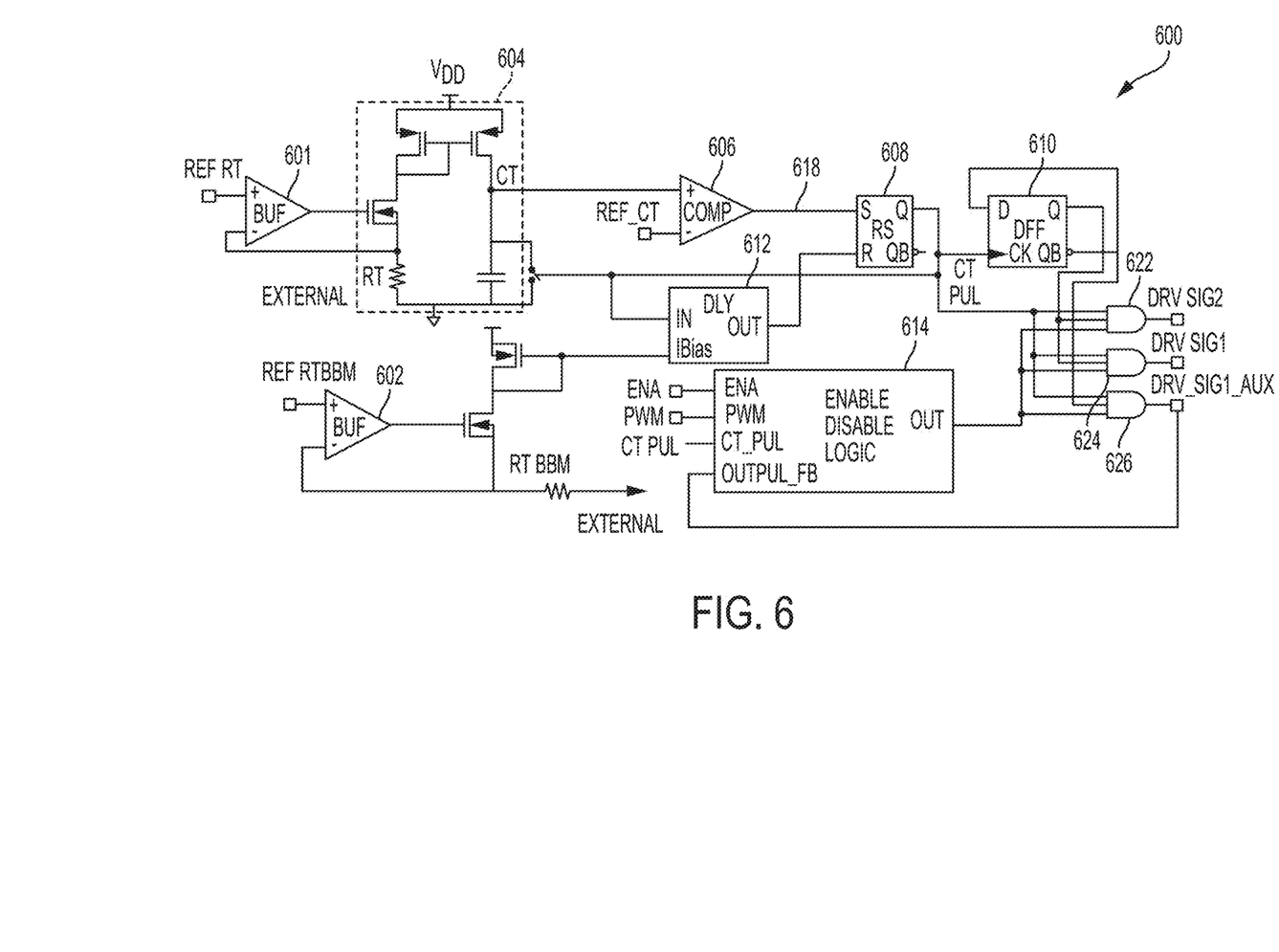
FIG. 6 is a schematic circuit diagram of an exemplary driver control signal unit for use with DC-DC converters of the types described herein, according to some aspects of the present disclosure.

FIG. 6 is a schematic circuit diagram of an exemplary control circuit 600 for use with DC-DC converters of the types described herein, according to some aspects of the present disclosure. Control circuit 600 comprises an exemplary implementation of the driver control signal unit 516 and oscillator 522 shown in FIG. 5. In the exemplary circuit diagram in FIG. 6, control circuit 600 comprises buffers 601, 602, oscillator 604, comparator 606, Q flip flops 608, 610, delay circuit 612, and Enable Disable Logic 614. The driver control signal unit 516 further comprises output AND gates 622, 624 and 626.

According to some aspects of the present disclosure, control circuit 600 is configured to generate a plurality of voltage waveforms at the output of gates 622, 624 and 626 to control opening and closing of switches in the precharge circuit 414 and full bridge driver 210 in DC-DC converter 500 shown in FIG. 5, to implement the various phases of the driver as well as to provide current injection from the precharge circuit as discussed above in relation to FIGS. 3 to 5. In the control circuit 600, oscillator 604 and comparator 606 are configured to generate a high frequency gate drive signal 618. The gate drive signal 618 may have a frequency of 10 MHz, 15 MHz, 20 MHz, 24 MHz, 30 MHz, 34 MHz, 40 MHz, between 5 and 15 MHz, between 15 and 40 MHz, or any value or range of values within such ranges. The gate drive signal 618 may be modulated by the delay circuit 612 to generate non-overlap time, Enable Disable Logic 614 and Q flip flops 608, 610 to provide at the output of gate 622 a control signal DRV_SIG2, at the output of gate 624 a control signal DRV_SIG1 and at the output of gate 626 a control signal DRV_SIG1_AUX. The oscillator and comparator may operate continuously during operation of the DC-DC converter to provide high frequency oscillation signals. Alternatively and optionally, the oscillator and comparator may be turned off to save power and increase efficiency when the LC resonant tank circuit is off and not transmitting.

In some embodiments, DRV_SIG1 and DRV_SIG2 are control signals at the output of drive control signal unit 512 shown in FIG. 5 and are configured to drive the opening and closing of gates for switch pairs Q2/Q3 and Q1/Q4, respectively, in the full bridge driver in any of the DC-DC converters as shown in FIGS. 2A, 2B, and 3-5. In some embodiments, the DRV_SIG1 and DRV_SIG2 may comprise pulse sequences that enable opening and closing switch pair Q1/Q4 during a first phase of the operation of the resonant DC-DC converter as discussed above in relation to FIG. 3. The DRV_SIG1 and DRV_SIG2 may also comprise pulse sequences that enable opening and closing switch pair Q2/Q3 during a third phase of the operation of the resonant DC-DC converter as discussed above in relation to FIG. 3. The output of the delay circuit 612 may be based on control signal REF_RTBBM to generate and modulate the break-before-make (BBM) time between the switch pair opening in the first phase and third phase. The break-before-make time therefore may also be referred to as the non-overlap time that corresponds to the second phase as discussed above in relation to FIG. 3. Any suitable non-overlap time period may be selected to control the switches in the full bridge driver such as full bridge driver 210 in any of FIGS. 2A, 2B, and 3-5 to perform soft switching to increase conversion efficiency and reduce common mode current emissions. In one non-limiting example, the non-overlap time period is 6.4 nanoseconds (ns). In another example, the non-overlap time period is 4.8 ns. Alternative values of the non-overlap time are possible, such as any time before 3 and 10 ns, or any other suitable time value.

Control signal DRV_SIG1_AUX may be configured to drive a precharge circuit such as precharge circuit 414 as shown in FIGS. 4 and 5. In some embodiments, DRV_SIG1_AUX may be configured to activate transistors in the precharge circuit to inject current to kick start the resonant LC circuit comprising the primary winding.

Figure 7:
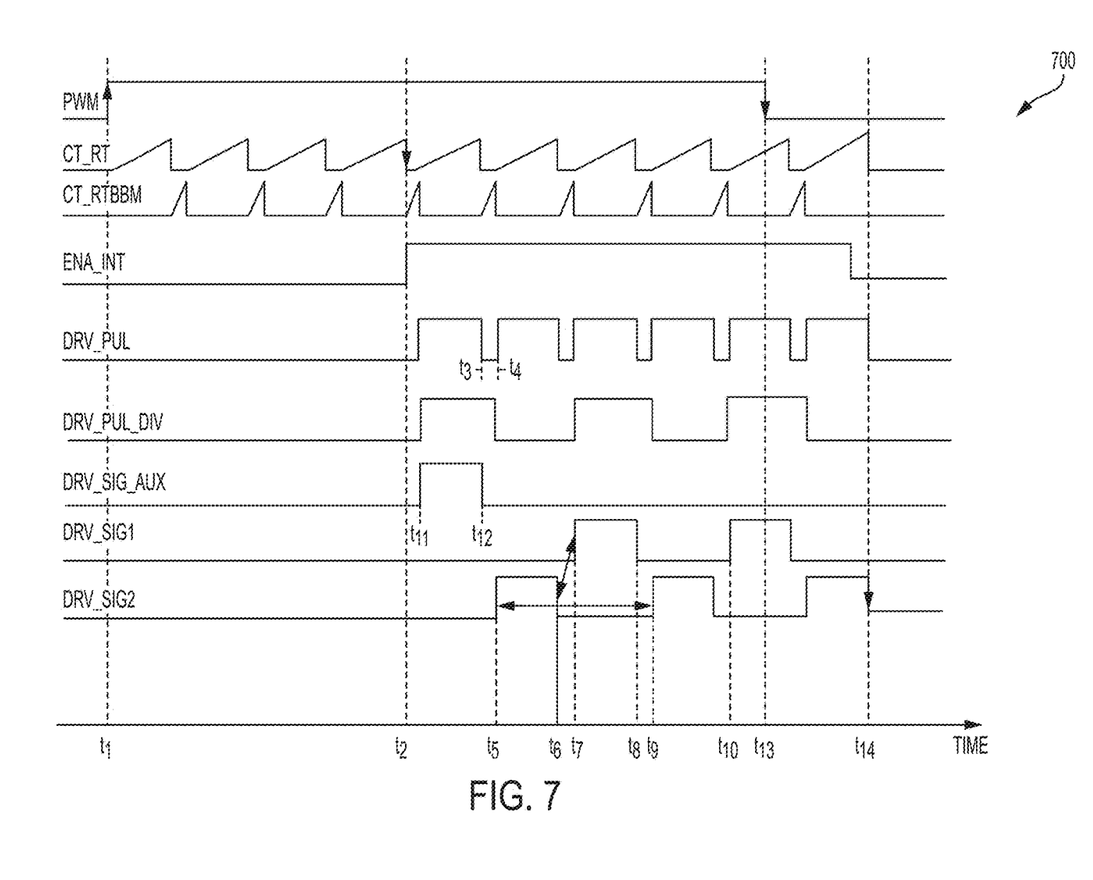
FIG. 7 is a schematic timing diagram of various signals which may be produced during operation a DC-DC converter of the types described herein, according to some aspects of the present disclosure.

FIG. 7 is a schematic timing diagram of various signals which may be produced by the components of a DC-DC converter of the types described herein, according to some aspects of the present disclosure. More specifically, timing diagram 700 depicts the temporal relationship among the signal waveforms as a function of time at the outputs of different components of DC-DC converter 500 and control circuit 600. Timing diagram 700 comprises exemplary signal waveforms PWM representing a voltage PWM in FIG. 6, CT_RT representing a voltage on resistor RT in FIG. 6, CT_RTBBM representing a voltage on resistor RT BBM in FIG. 6, ENA_INT representing an output of Enable Disable Logic 614 in FIG. 6, DRV_PUL and DRV_PUL_DIV representing an output of flip flops 608 and 610, respectively, as well as output drive signals DRV_SIG_AUX, DRV_SIG1 and DRV_SIG2.

Timing diagram 700 shows that a transition to the ON state of the pulse-width modulation signal PWM may be synchronized with oscillation signals at CT_RT starting at time $t_1$. In some embodiments, PWM may be a feedback PWM signal from PWM comparator 574 modulated by the signal FB in the output of the DC-DC converter 500 as shown in FIG. 5. In some embodiments, drive control signals such as DRV_SIG_AUX, DRV_SIG1 and DRV_SIG2 may not be provided until a certain delay time (between $t_1$ and $t_2$) is passed, to allow a comparator and oscillator, such as comparator 606 and oscillator 604 in FIG. 6, to settle and stabilize. In some embodiments, the delay of the pulse output is based on the output ENA_INT of the Enable Disable Logic 614 as shown in FIG. 6. In one non-limiting example, the comparator 604 may be allowed to settle for four (4) cycles of CT_RT prior to start of the gate drive control signals at time $t_2$.

In some embodiments, drive pulse DRV_PUL output from flip flop 608 may be modulated with the non-overlap time or break-before-make time period (between $t_3$ and $t_4$) based on CT_RTBBM. DRV_SIG2 is configured to periodically turn on the pair of switches Q1 and Q4 in the full bridge driver 210 at the beginning of a drive period between $t_5$ and $t_9$. DRV_SIG1 is configured to periodically turn on the pair of switches Q2 and Q3 in the full bridge driver 210 at the beginning of a drive period between $t_7$ and $t_{10}$. The period during which the pair of switches Q1 and Q4 is kept on (between $t_5$ and $t_6$) may be the first phase of the operating sequence as discussed above in relation to FIG. 3, while the period during which the pair of switches Q2 and Q3 is kept on (between $t_7$ and $t_8$) may be the third phase of the operating sequence. However, other arrangements for the first and third phases may also be used, for example turning on the pair of switches Q2 and Q3 during the first phase. The non-overlap time between $t_6$ and $t_7$ as well as between $t_8$ and $t_9$ may represent the second phase of the operating sequence and is controlled by the non-overlap time or break-before make time period between $t_3$ and $t_4$.

DRV_SIG_AUX is configured to activate the switches in the precharge circuit 414. This is done between a period $t_{11}$ and $t_{12}$ proximate to the start of the output of the gate drive control signals at time $t_2$ and prior to turning on the switches in the full bridge driver according to DRV_SIG1 and DRV_SIG2 to inject a current in the resonant circuit comprising the primary transformer winding.

At time $t_{14}$, a falling edge of one of the driver signals DRV_SIG2 represents the disable signal of a driver control signal sequence. Time $t_{14}$ may be different from the falling edge $t_{13}$ of the signal PWM to synchronize the disable signal with the output of the driver control signal sequence. Although less than three driver periods are shown for the drive control signals DRV_SIG1 and DRV_SIG2, any suitable number of repetitions may be provided in between $t_2$ and $t_{14}$ for transmission of power across the isolation barrier in a DC-DC converter according to some embodiments of the present disclosure.

Figure 8:
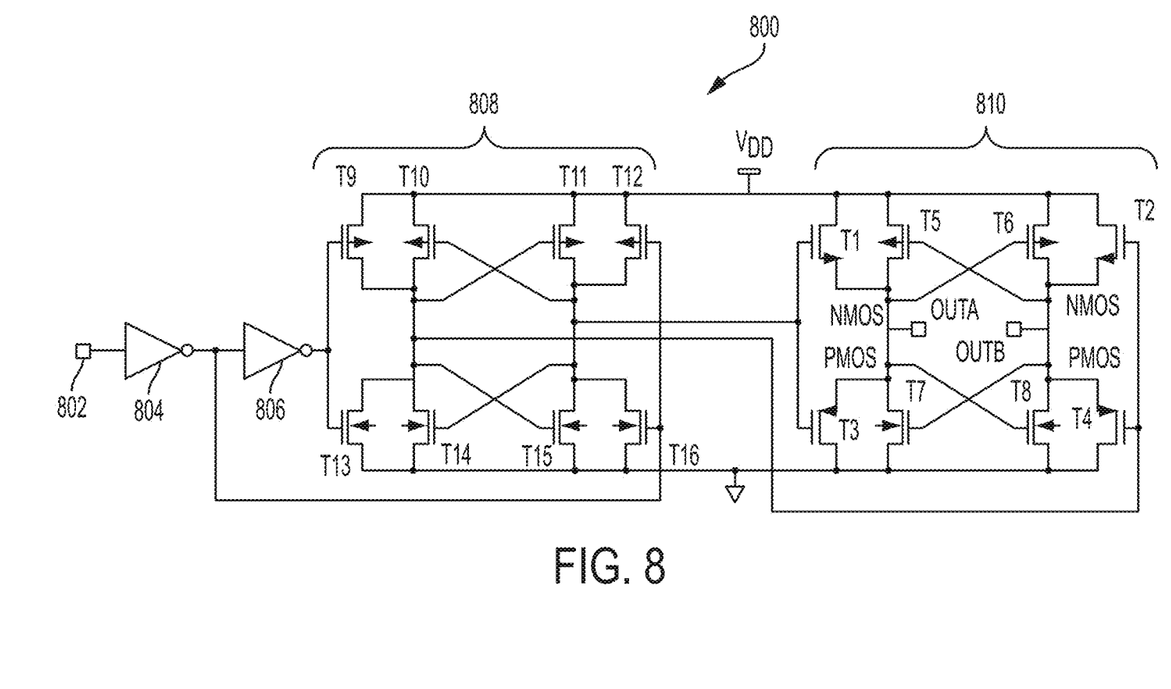
FIG. 8 is a schematic circuit diagram of an exemplary gate driver circuit for use with a DC-DC converter of the types described herein, according to some aspects of the present disclosure.

FIG. 8 is a schematic circuit diagram of an exemplary gate driver circuit 800 for use with a DC-DC converter of the types described herein, according to some aspects of the present disclosure.

According to some aspects of the present disclosure, the exemplary gate driver circuit 800 may be a symmetric gate driver comprising two inverting amplifiers 804, 806, a first transistor stage 808 comprising 8 transistors T9-T16 and a second transistor stage 810 comprising a pair of NMOS transistors T1, T2, a pair of PMOS transistors T3, T4 and 4 transistors T5-T8.

In some embodiments, output nodes OUTA/OUTB of the symmetric gate driver 800 are configured to turn on and off the vertical pair of switches Q1 and Q4 at substantially the same time in response to a signal DRV_SIG2 according to FIG. 6 and FIG. 7. Output nodes OUTA/OUTB of the symmetric gate driver 800 may also be configured to turn on and off the vertical pair of switches Q2 and Q3 at substantially the same time in response to a signal DRV_SIG1 according to FIG. 6 and FIG. 7. In some embodiments, two symmetric gate drivers may be provided, each configured to turn on and off the vertical pair of switches Q1 and Q4 and the pair of switches Q1 and Q3, respectively. The symmetric gate driver configuration helps reduce delays between the turning on/off both switches in the pair such that the voltage waveforms at the two transformer terminals are symmetrical to suppress common mode voltage which causes dipole emission.

Figure 9:
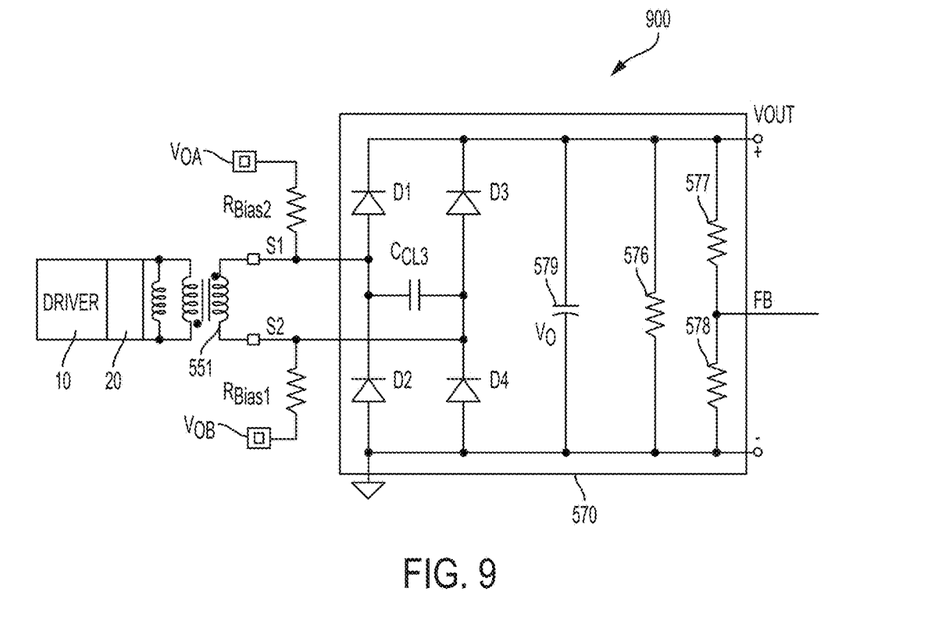
FIG. 9 is a schematic circuit diagram of an exemplary isolated DC-DC converter 900 according to some aspects of the present disclosure.

FIG. 9 is a schematic circuit diagram of an exemplary isolated DC-DC converter 900 according to some aspects of the present disclosure. DC-DC converter 900 includes several of the components of DC-DC converters 100 of FIG. 1 and 500 of FIG. 5, but additionally includes a pair of bias resistors $R_{Bias1}$, $R_{Bias2}$ and two voltage nodes $V_{OA}$, $V_{OB}$.

In the example shown in FIG. 9, bias resistors $R_{Bias1}$ and $R_{Bias2}$ are coupled between a terminal of the secondary winding S1/S2, respectively, and a voltage $V_{OA}/V_{OB}$. In some embodiments, both voltages $V_{OA}$, $V_{OB}$ represent the output voltage $V_{OUT}$ of the DC-DC converter to stabilize the voltages at the two terminals S1, S2 at values close to $V_{OA}$ and/or $V_{OB}$. In one embodiment, the $R_{Bias}$ resistors are of the same value and the $V_{OA}$, $V_{OB}$ voltage values are set to be approximately half of the value of $V_{OUT}$. By shunting the terminals S1 and S2 of the secondary winding with half of the output voltage via bias resistors, rapid variations of the output voltage between the two terminals S1 and S2 of the secondary winding may be reduced during a transition from an OFF state of the full bridge driver to an ON state of the full bridge driver and EMI due to common mode current across the isolation barrier between the primary and secondary windings may be improved.

The isolated DC-DC converters described herein may be used in applications. For example, automotive, consumer electronics, industrial, and healthcare applications may all make use of the technology described herein.

Figure 10:
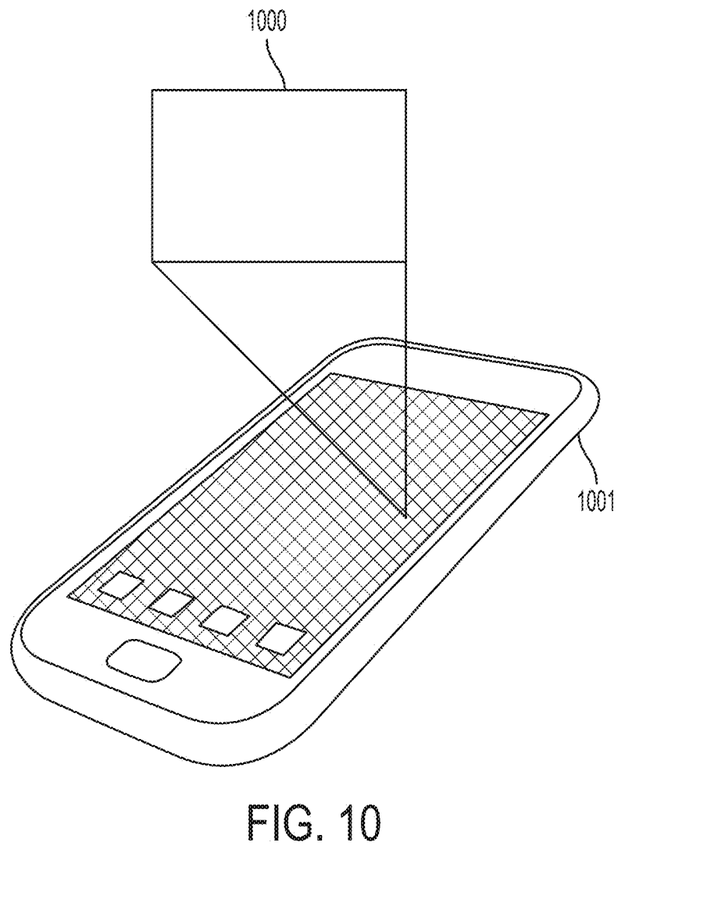
FIG. 10 is a schematic diagram showing an exemplary application of an apparatus in a portable electronic device setting, according to some embodiments.

FIG. 10 is a schematic diagram showing an exemplary application of an apparatus in a portable electronic device setting, according to some embodiments. An isolated DC-DC converter 1000 may be used in a portable electronic device 1001 to transmit power across an isolation barrier with low EMI. Thus, sensors, antennas and electrical signal transmission lines within the portable electronic device 1001 in close proximity to the DC-DC converter 1000 are not affected by EMI emitted from the DC-DC converter 1000. The portable electronic device 1001 may be smartphone, personal digital assistance (pda), tablet, or other portable device. Other such devices may also make use of DC-DC converters of the types described herein.

While FIG. 10 illustrates an example of a portable electronic device incorporating aspects of the present application, other uses are possible. For example, one or more isolated DC-DC converter devices may be employed in an automobile or a medical instrument. Various embodiments of the present application may be implemented to provide high efficiency, low EMI DC to DC power conversion.

The terms "approximately" and "about" may be used to mean within ±20% of a target value in some embodiments, within ±10% of a target value in some embodiments, within ±5% of a target value in some embodiments, or within ±2% of a target value in some embodiments. The terms "approximately" and "about" may include the target value.

What is claimed is:

1. A DC-DC converter, comprising:
a primary winding having first and second terminals;
a secondary winding separated from the primary winding by an isolation barrier;
a full bridge driver;
a first capacitor coupled between the full bridge driver and the first terminal of the primary winding;
a second capacitor coupled between the full bridge driver and the second terminal of the primary winding, wherein
the full bridge driver is an H-bridge circuit having a plurality of switches and wherein
the first capacitor is coupled between a common node of a first switch and a second switch of the plurality of switches and the first terminal of the primary winding, and
the second capacitor is coupled between a common node of a third switch and a fourth switch of the plurality of switches and the second terminal of the primary winding.

2. The DC-DC converter of claim 1, wherein the primary winding and secondary winding are integrated on a same substrate.

3. The DC-DC converter of claim 1, wherein the first capacitor and the second capacitor are of substantially the same capacitance value.

4. The DC-DC converter of claim 1, further comprising a parallel capacitor in parallel with a switch of the plurality of switches.

5. The DC-DC converter of claim 1, further comprising a current injection circuit coupled to the full bridge driver and configured to become active during a transition from an OFF state of the full bridge driver to an ON state of the full bridge driver.

6. The DC-DC converter of claim 1, further comprising a bias resistor coupled between a terminal of the secondary winding and a voltage proportional to an output voltage of the DC-DC converter.

7. The DC-DC converter of claim 1, further comprising a full bridge rectifier coupled to the secondary winding and a parallel capacitor coupled between a first terminal and a second terminal of the secondary winding.

8. A method of operating a DC-DC converter comprising a primary winding, a secondary winding and a full bridge driver, wherein the secondary winding is separated from the primary winding by an isolation barrier, the method comprising:
driving a signal from the full bridge driver through a serial current path through a first capacitor coupled to a first terminal of the primary winding, the primary winding and a second capacitor coupled to a second terminal of the primary winding, wherein
the full bridge driver is an H-bridge circuit having a plurality of switches and wherein
a first voltage node of the full bridge driver is a common node of a first switch and a second switch of the plurality of switches, and
a second voltage node of the full bridge driver is a common node of a third switch and a fourth switch of the plurality of switches.

9. The method of claim 8, wherein the primary winding and secondary winding are integrated on a same substrate.

10. The method of claim 8, wherein the first capacitor and the second capacitor are of substantially the same capacitance value.

11. The method of claim 8, wherein the DC-DC converter further comprises a parallel capacitor in parallel with a switch of the plurality of switches.

12. The method of claim 8, further comprising:
engaging a current injection circuit coupled to the full bridge driver to alter an amount of current passing through the primary winding during a transition from an OFF state of the full bridge driver to an ON state of the full bridge driver.

13. The method of claim 8, further comprising:
coupling a terminal of the secondary winding with a voltage proportional to an output voltage of the DC-DC converter with a bias resistor.

14. The method of claim 8, further comprising coupling a full bridge rectifier to the secondary winding, and coupling a first terminal and a second terminal of the secondary winding via a parallel capacitor.

15. A resonant DC-DC converter, comprising:
a transformer having a primary winding and a secondary winding integrated on a semiconductor substrate, wherein the secondary winding is separated from the primary winding by an isolation barrier;
a full bridge driver capacitively coupled to the primary winding with a first serial capacitor and a second serial capacitor, wherein
the full bridge driver is an H-bridge circuit having a plurality of switches and wherein
the first serial capacitor is coupled between a common node of a first switch and a second switch of the plurality of switches and a first terminal of the primary winding, and
the second serial capacitor is coupled between a common node of a third switch and a fourth switch of the plurality of switches and a second terminal of the primary winding;
a feedback loop coupled between an output of the DC-DC converter and an input of the full bridge driver.

16. The resonant DC-DC converter of claim 15, wherein the second serial capacitor has substantially the same capacitance value as the first serial capacitor.

17. The resonant DC-DC converter of claim 15, wherein the feedback loop comprises a pulse-width modulated signal generator configured to generate a pulse-width modulated signal representing an output signal of the DC-DC converter.

18. The resonant DC-DC converter of claim 15, further comprising a parallel capacitor in parallel with a switch of the plurality of switches.

19. The resonant DC-DC converter of claim 15, further comprising a bias resistor coupled between a terminal of the secondary winding and a voltage proportional to an output voltage of the DC-DC converter.

20. The resonant DC-DC converter of claim 15, further comprising a full bridge rectifier coupled to the secondary winding and a parallel capacitor coupled between a first terminal and a second terminal of the secondary winding.

* * * * *